United States Patent [19]

Frey

[11] Patent Number: 4,582,168

[45] Date of Patent: Apr. 15, 1986

[54] HUNTER'S TREE SEAT

[76] Inventor: Ernest W. Frey, P.O. Box 1419, Sand Springs, Okla. 74063

[21] Appl. No.: 765,531

[22] Filed: Aug. 15, 1985

[51] Int. Cl.[4] .......................... A45F 3/26; A47C 9/10; A63B 27/00
[52] U.S. Cl. .................................. 182/187; 108/135; 108/152
[58] Field of Search ................ 182/187, 188; 108/152, 108/135

[56] References Cited

U.S. PATENT DOCUMENTS

| 2,512,174 | 6/1950 | Roeder | 182/187 |
| 3,949,835 | 4/1976 | Butler | 182/187 |
| 3,990,537 | 11/1976 | Swenson | 182/187 |
| 4,069,891 | 1/1978 | McClung | 182/187 |
| 4,129,198 | 12/1978 | Hunter | 182/187 |
| 4,150,733 | 4/1979 | Plummer | 182/187 |
| 4,307,672 | 12/1981 | Shikimi | 108/152 |
| 4,488,620 | 12/1984 | Gibson | 182/187 |

Primary Examiner—Reinaldo P. Machado
Attorney, Agent, or Firm—Head, Johnson & Stevenson

[57] ABSTRACT

A portable tree seat for hunters which includes a support arm which is pivotally attached to a tree clamp. The arm can be fixed in several rotatable positions with respect to the clamp. A seat is supported from a fork support which is adjustable along the arm at several positions for a horizontal position of the arm and at another position for a vertical position of the arm. The seat may be rotated with respect to the arm to several fixed positions.

5 Claims, 10 Drawing Figures

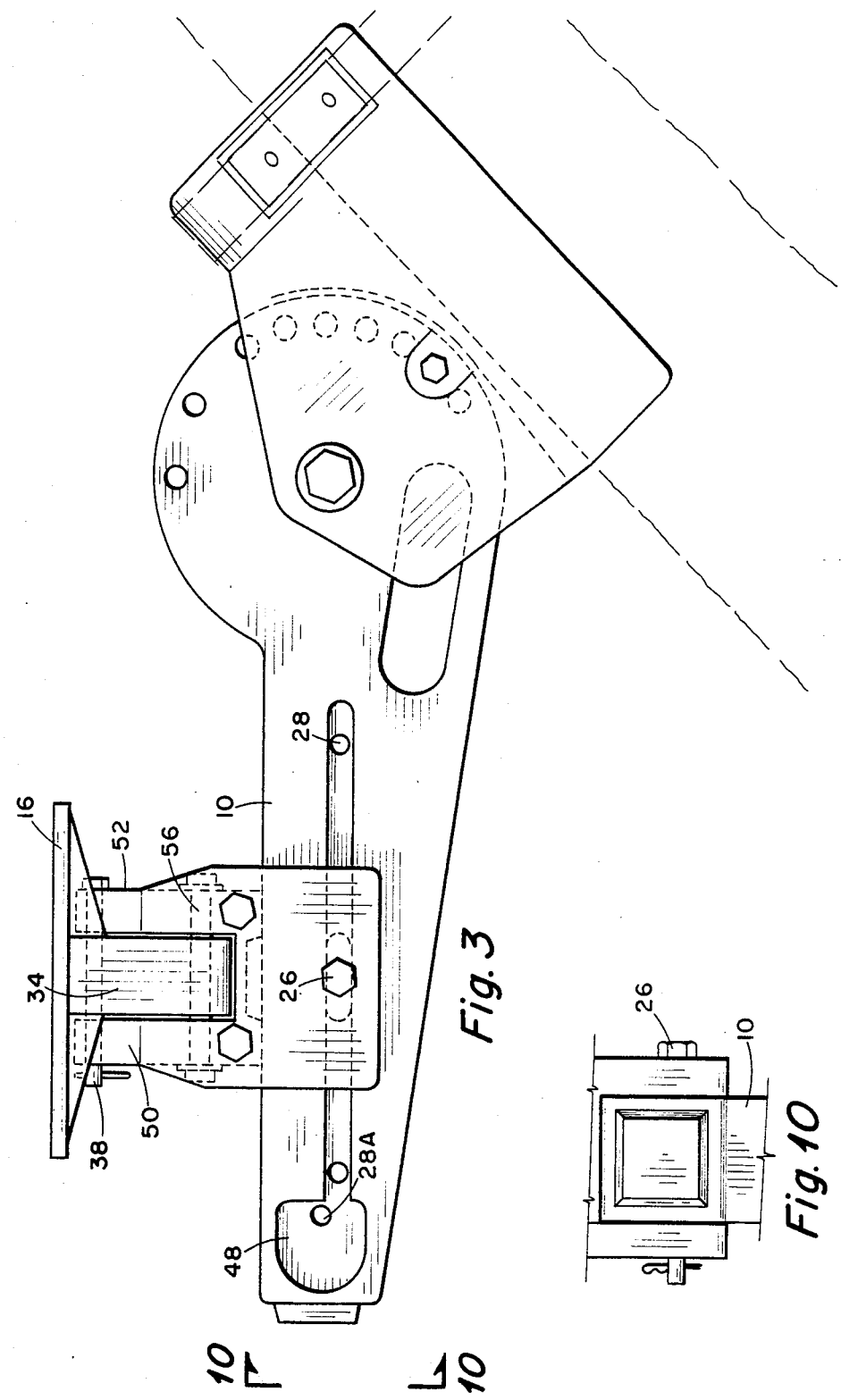

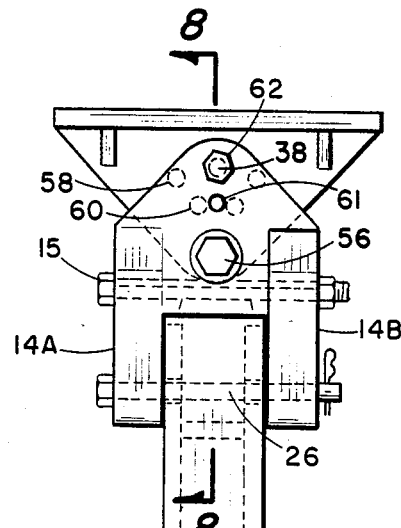
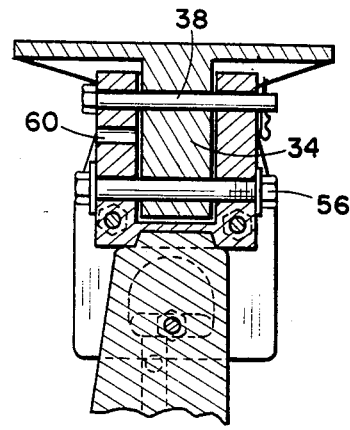
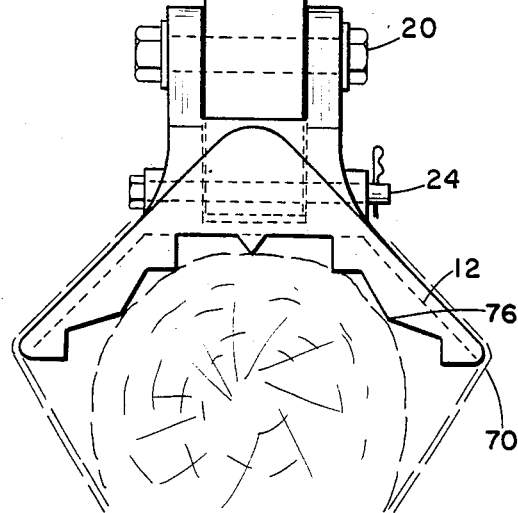
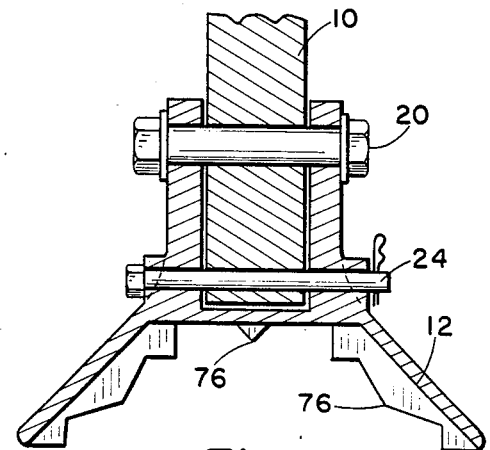
Fig. 5
Fig. 8
Fig. 9

HUNTER'S TREE SEAT

BACKGROUND OF THE INVENTION

1. Field of the Invention

This invention relates to a portable and adjustable tree seat for hunters and the like.

2. Background of the Invention

Many people spend long hours waiting in trees for certain events to happen. One such class of people is the hunter who may wait for hours in a tree for game such as deer to appear. The hunter may just climp up a tree and sit on a limb and make himself as comfortable as possible. Ordinarily though, it is impossible to become very comfortable on just a regular tree limb. Therefore, man has devised various portable tree seats which he can attach in some manner to the tree and wait in that tree seat until the game appears. Frequently, when these seats are placed on the limbs of a tree, the seat itself is not always oriented properly for comfort. There is thus a need for a seat with a wide range of adjustability.

SUMMARY OF THE INVENTION

The hunter seat includes are an member having a longitudinal axis, a limb holder and a seat support for an adjustable seat. Means are provided to connect the limb holder and arm so that the arm can pivot with respect to the limb holder and be secured in any of several different rotational positions. The arm can thus be adjusted to be horizontal on a slanting limb. A seat support is movable along the arm to several positions, and may be secured to each such position. In each such position, the seat can be pivoted about the seat support so that the seat may be adjusted to several rotational positions so that it can be in a horizontal position if desired. The arm can be adjusted to be vertical and the seat support adjusted about the vertical arm so that the seat can be horizintal.

It is well known that limbs make various degrees of contact with the basic trunk and with the horizontal plane. However, within the limits of my tree seat, I can make adjustments to compensate for any such angle of the limb. I can adjust the arm in one plane to any of several positions or angles with respect to the tree holder. I can also adjust the plane of the seat with respect to the arm to a wide variety of fixed positions in a plane which is perpendicular to the line of adjustments of the arm with respect to a tree holder.

I also have a novel way of supporting the seat from the arm and being adjustable in several positions.

A better understanding of the invention can be had from the following description taken in conjunction with the drawings.

BRIEF DESCRIPTION OF THE DRAWINGS

FIG. 3 is a side elevational view of my hunter tree seat mounted on a limb having an angle with the horizontal.

FIG. 5 is a view taken along the line 5—5 of FIG. 2.

FIG. 8 is a view taken along the line 8—8 of FIG. 5.

FIG. 9 is a view taken along the line 9—9 of FIG. 2.

FIG. 10 is a view taken along the line 10—10 of FIG. 3.

DETAILED DESCRIPTION OF THE PREFERRED EMBODIMENT

Figure 1:
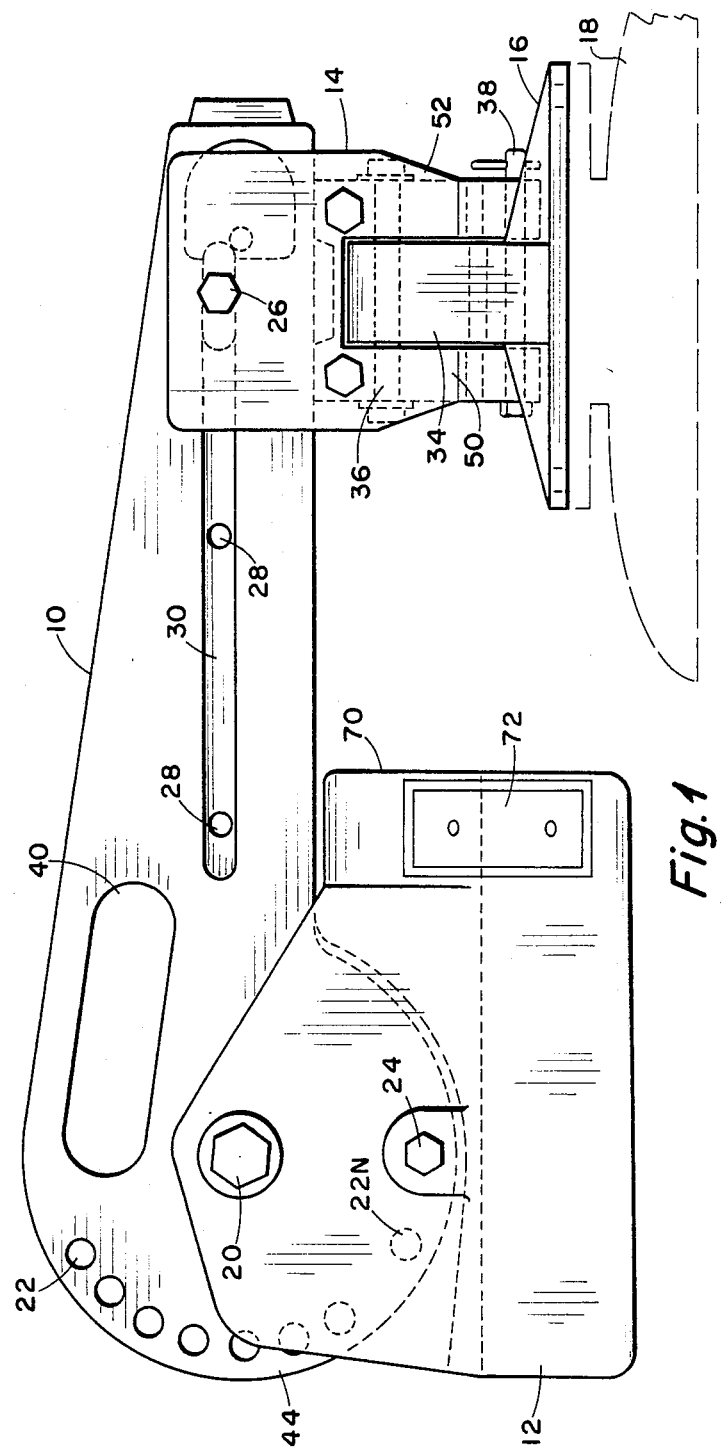
FIG. 1 is a side elevation view of my hunter tree seat in a carrying position.

Attention is first directed to FIG. 1 which shows a preferred embodiment of my hunter tree seat which includes arm 10, tree holder or clamp 12 and seat support means 14. The tree holder 12 is pivotally connected to the arm by pivot 20 which may be a bolt extending therethrough. There are a plurality of angle adjusting holes 22 to 22N in the head 44 of the arm. The arm is held in the selected position by pin 24. Pin 24 is removable and is insertable through any of the holes 22 through 22N depending upon the selected rotational position of arm 10 with respect to tree holder 12.

Seat support yoke 14 is provided with a seat holder 16 for supporting a seat cushion 18 shown in phantom. Seat support yoke 14 is supported from arm 10 by support pin 26 which may be inserted through any of holes 28 which extends through a slot 30 and through the arm 10. The seat support yoke 14 has a first prong 50 and a second prong 52. The leg 34 of the seat holder 16 is positioned between these two prongs and held therein in by pivot 56. A pin 38 holds the seat holder 16 in a selected position with respect to the seat support yoke. I have also shown a hand hole 40 in arm 10 for use when carrying my portable tree seat. The tree seat is shown in its carrying position in FIG. 1. This illustrates how compact it is.

Figures 2, 6:
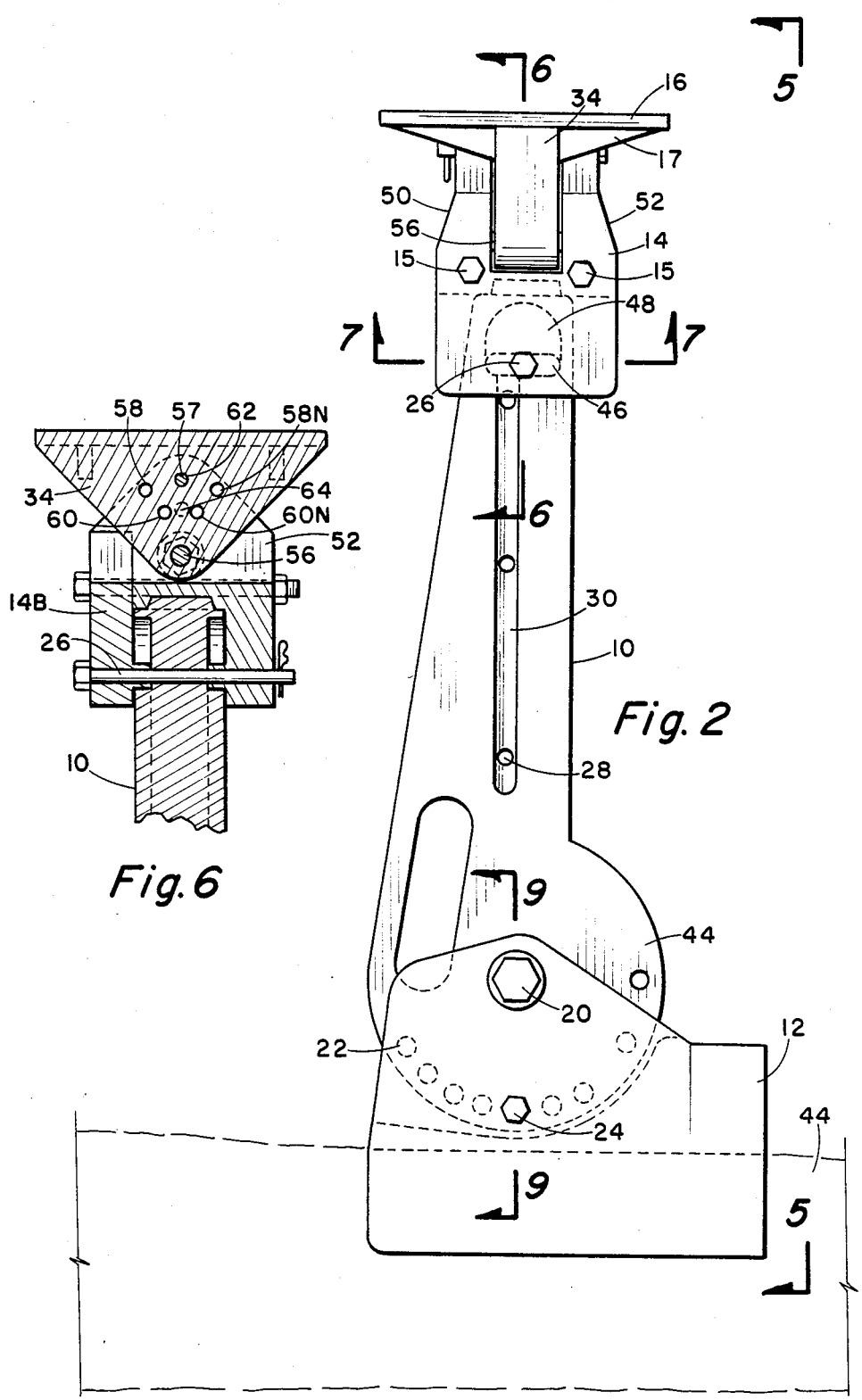
FIG. 2 is a side elevational view showing my hunter tree seat mounted on a horizontal limb.
FIG. 6 is a view taken along the line 6—6 of FIG. 2.
Figure 7:
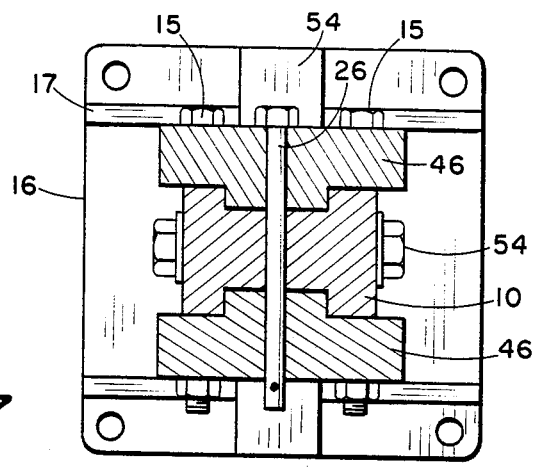
FIG. 7 is a view taken along the line 7—7 of FIG. 2.

Attention is next directed to FIG. 2 and the sectional views in FIGS. 6, 7 and 9 which shows my tree seat mounted upon a horizontal limb 44. When in this position, the arm head 44 of arm 10 is rotated such that pin 24 is positioned in the center hole 22 so that arm 10 is in essentially a vertical position. This is easily accomplished from the position shown in FIG. 1 as all that is necessary to do is to clamp the tree holder 12 onto the limb 44 in a manner which will be explained more fully hereinafter, remove pin 24 and rotate the arm to the desired position and then reinsert the pin 24. This fixes the rotational position of arm 10 with respect to the limb.

Still referring to FIG. 2, here it is shown that the seat holder 16 is essentially at right angles to the longitudinal axis of arm 10. This is necessary so that the seat will be in the horizontal position when the tree seat is mounted upon the horizontal limb 44 structure to permit this will now be discussed. Slot 30 opens up into a cavity 48 in arm 10. This is to permit holding hump or ridge 46 to be rotated from the position shown in FIG. 1 to the position shown in FIG. 3. This cavity 48 is essentially the same depth as slot 30 and takes the general configuration shown in FIG. 2. The ridge 46 is of a size to slide along through slot 30 and also be rotatable within cavity 48. The ridge is about the same width as the width of slot 30 and preferably has a length about three times the width of slot 30. A hole is provided in ridge 46 through which support pin 26 can be inserted. Seat support yoke 14 is provided with a first prong 50 and a second prong 52. Seat support 16 has a leg 54 which extends between prongs 50 and 52. As shown in FIGS. 3 and 6, leg 34 is rotatably secured between prongs 50 and 52 by a pivot pin 56. As shown in FIG. 6, leg 34 has a plurality of holes 58 and 58N on one arc with a first radius with pivot 56 as the center and through holes 60 and 60N shown on another and smaller radius with respect to pivot 56 as center. Prongs 50 and 52 have a first hole 62 on the same radius with respect to pivot pin 56 as holes 58 and 58N and a second hole 64 on the same radius as arm holes 60 and 60N. This arrangement of holes gives great flexability without weakening the leg 54.

Figure 4:
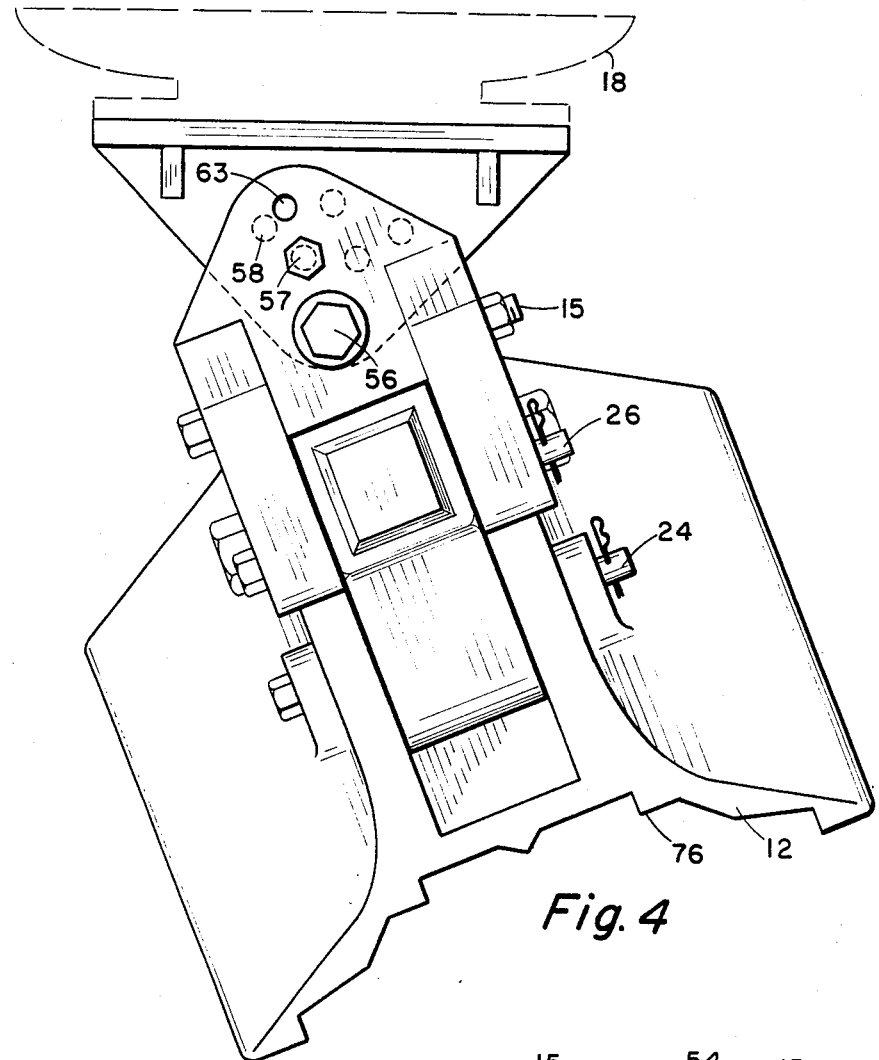
FIG. 4 is a view from the seat end back to the tree end of the underside of my tree seat.

As shown in FIG. 5, yoke support 14 is make in two parts, 14A and 14B and are held in position by bolts 15 of which there are two shown in FIG. 2. This is to facilitate assembly of the tree seat. Tree holder 12 as shown in FIG. 1 is provided with any suitable strap 70 and securing means 72. As shown in FIGS. 5 and 9, tree holder 12 is also provided with a plurality of serrations 76 along two legs which make an angle of about 90° with each other. As mentioned above, the tree seat can be used on just about any angle limb. In FIG. 4, it is shown set on a tree limb which is directed to the left and away from the viewer.

It is believed that it is quite apparent from the above description and comments that this tree seat can be used on limbs or branches of various attitudes. For example, one first places the tree holder 12 over the selected limb and secures it there with strap 70 and fastener 72. Pin 24 is removed and arm 10 is pivoted to the desired position and pin 24 is reinserted and preferably secured there with a cotter key as shown. One then determines whether or not one wishes to have the seat in the position shown in FIG. 2 or in FIG. 3. The selected hole 28 is then used to position the seat support yoke 14. If one wishes to have it in the horizontal position, one would have it in one of the three holes 28 shown in FIG. 3. (Of course, any number of holes can be used as desired.) Position pin 26 is then inserted through the holes in the yoke member and the arm 10 to secure the seat yoke support 14 in this position. The seat holder 16 is then rotated about pivot 56 until it is in the selected position and aligned with one of the holes 58 or 60 as shown in FIG. 6 and then the pin 57 is inserted through the appropriate holes in the leg 34 and the seat support yoke 14. If one wishes to have the seat in the position shown in FIG. 2, the holding ridge 46 is pushed into the cavity 48 and rotated to the position shown in FIG. 2 at which time the holding pin 26 is inserted through the proper hole 28A as shown in FIG. 3. It is thus clear that I can adjust my seat in three ways. I can rotate the angle of the arm 10 with respect to the tree holder 12, the position of the seat support yoke 14 along the arm 10 to be either in any of the positions of holes 28 and either of the positions shown in FIGS. 3 and 4 and I can rotate the seat support 16 about pivot 56. This gives me tremendous flexibility in adjusting my seat for comfort and for obtaining the most appropriate position for the purposes of the seat such as the hunting of game.

While this invention has been described with a certain degree of particularity, it is manifest than many changes may be made in the details of construction in the arrangement of components without departing from the spirit and scope of the disclosure. It is understood that the invention is not limited to the embodiment set forth herein for purposes of exemplification, but is limited only by the scope of the attached claim or claims, including the full range of equivalency to which each element thereof is entitled.

What is claimed:

1. A hunter tree seat comprising:
   an arm;
   a limb holder for attaching to a tree;
   a seat support;
   first connecting means rotatably connecting said arm to said limb holder and including securing means to secure the limb holder and seat support in any one of several rotational positions;
   second connecting means for rotatably connecting the arm to said seat support including means to secure said seat support and said arm in any one of several positions.

2. A hunter tree seat as defined in claim 1 which said seat support includes a seat support yoke, a seat member having a leg extending into the space between the prongs of said yoke and a pivot holding said leg in said yoke and means to secure said leg at any of a plurality of rotational positions of said leg member about said pivot.

3. A hunter tree support as defined in claim 2 in which said first connecting means includes a longitudinal slot on each side of said arm and a cavity semi-circular shaped at the end of said slot opposite the limb holder and a plurality of holes through said slot and said arm and at least one hole through said cavity.

4. A hunter tree support as defined in claim 3 including a holding ridge supported by said seat support yoke and of a size to slidably fit within said slot and to revolve within said cavity.

5. A hunter tree seat comprising:
   an arm having an elongated section which is essentially rectangular in cross-section and a head at one end of said elongated section, said elongated section having an elongated slot on either side thereof which opens into a cavity of largely semi-circular shape, said cavity being at the end opposite said head, there being a plurality of arm holes through said slot and one hole in said cavity, said head having a center pivot hole therethrough and a plurality of positioning holes along the outer periphery of said head on an arc with the center being said pivot hole;
   a limb holder for connecting to said head and having a projection on either side thereof with a hole therethrough, a bolt for insertion through said pivot holes of said limb holder and said head, said limb holder having a position hole therethrough, a limb holder positioning bolt for insertion through said holes and said positioning holes of said head, said limb holder having two arms at essentially 90° with serrations on the inside thereof, and a means for holding the two arms of said limb holder to a tree;
   a tree seat holder including a tree seat yoke having two yoke members which fit on opposite side of said arm and a holding ridge which fits into said elongated slot of said arm, a ridge hole extending through said holding ridge, and a second positioning bolt for insertion through said ridge holes in a selected arm hole in said slot or said cavity;
   said support yoke having two prongs each having a yoke pivot hole therethrough and aligned with each other and a prong positioning hole through said prongs;
   a seat support having a leg extendable into the space between said prongs, a hole in said leg, a pivot bolt insertable through said pivot holes of said prongs and said leg, said leg having a plurality of leg positioning holes on one or more arc having said yoke pivot hole as the center and the same radius as the distance the appropriate prong positioning hole is from said yoke pivot hole, and a positioning bolt for insertion through said positioning hole of said prongs and said leg.

* * * * *